(12) United States Patent
Picker et al.

(10) Patent No.: US 7,797,272 B2
(45) Date of Patent: Sep. 14, 2010

(54) SYSTEM AND METHOD FOR DYNAMIC PLAYLIST OF MEDIA

(75) Inventors: Saar Picker, Bellevue, WA (US); Michael J. Carreno, Redmond, WA (US); Frank Flannery, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 10/839,093

(22) Filed: May 5, 2004

(65) Prior Publication Data

US 2004/0210533 A1 Oct. 21, 2004

Related U.S. Application Data

(63) Continuation of application No. 09/905,011, filed on Jul. 13, 2001, now Pat. No. 6,748,395.

(60) Provisional application No. 60/218,287, filed on Jul. 14, 2000.

(51) Int. Cl.
*G06F 17/00* (2006.01)

(52) U.S. Cl. ........................ 707/602; 707/607; 707/610; 707/690; 707/706; 707/827

(58) Field of Classification Search ............... 707/1–10, 707/100–104.1, 200–206, 600–831; 381/1–28
See application file for complete search history.

(56) References Cited

U.S. PATENT DOCUMENTS

| 5,486,645 | A |   | 1/1996  | Suh et al. ........................ 84/610 |
| 5,588,842 | A | * | 12/1996 | Nishimura et al. ...... 434/307 A |
| 5,616,876 | A |   | 4/1997  | Cluts ............................ 84/609 |
| 5,749,081 | A |   | 5/1998  | Whiteis ........................ 707/102 |
| 5,877,445 | A |   | 3/1999  | Hufford et al. ................. 84/602 |
| 6,041,311 | A |   | 3/2000  | Chislenko et al. ............. 705/27 |
| 6,356,971 | B1 | * | 3/2002 | Katz et al. .................... 710/301 |
| 6,389,467 | B1 |   | 5/2002 | Eyal ............................ 709/223 |
| 6,438,579 | B1 |   | 8/2002 | Hosken ....................... 709/203 |
| 6,502,194 | B1 | * | 12/2002 | Berman et al. ................ 726/28 |
| 6,526,411 | B1 | * | 2/2003 | Ward .......................... 707/102 |
| 6,545,209 | B1 |   | 4/2003 | Flannery et al. ............... 84/609 |
| 6,674,861 | B1 | * | 1/2004 | Xu et al. ...................... 380/252 |
| 2003/0089218 | A1 | | 5/2003 | Gang et al. .................... 84/615 |
| 2004/0167890 | A1 | * | 8/2004 | Eyal ............................. 707/3 |
| 2006/0080741 | A1 | * | 4/2006 | Nair ............................ 726/26 |

OTHER PUBLICATIONS

Appelbaum, M. et al., "Agile—A CAD/ CAM/ CAE Interface Language," *Society of Manufacturing Engineers: Technical Paper*, 1984, *MS*84-182, 1-19.

(Continued)

*Primary Examiner*—Isaac M Woo
(74) *Attorney, Agent, or Firm*—Woodcock Washburn LLP

(57) ABSTRACT

A system and methods for the dynamic generation of playlists to a user are provided. In connection with a system that convergently merges perceptual and digital signal processing analysis of media entities for purposes of classifying the media entities, various means are provided to a user for automatically generating playlists of closely related and/or similarly situated media entities for distribution to participating users. Techniques for providing a dynamic recommendation engine and techniques for rating media entities are also included. In an illustrative implementation, the playlists may be generated and stored allowing for user persistence from experience to experience.

10 Claims, 5 Drawing Sheets

OTHER PUBLICATIONS

Bendix, L. et al., "CoEd—A Tool for Versioning of Hierarchical Documents," B. Magnusson (Ed.), *System Configuration Management, Proc. ECOOP '98 SCM-8 Symposium*, Brussels, Belgium, Jul. 20-21, 1998.

Biglari-Abhari, M. et al., "Improving Binary Compatibility in VLIW Machines through Compiler Assisted Dynamic Rescheduling," *IEEE*, 2000, 386-393.

Boneh, D. et al., "Collusion-secure fingerprinting for digital data," *IEEE Trans. Information Theory*, 1998, 44(5), 1897-1905.

Bratsberg, S.E., "Unified Class Evolution by Object-Oriented Views," Pernul, G. et al. (Eds.), *Entity-Relationship Approach—ER '92. Proc. 11th International Conference on the Entity-Relationship Approach*, Karlsruhe, Germany, Oct. 7-9, 1992, 423-439.

Bresin, R. et al., "Synthesis and decoding of emotionally expressive music performance," *IEEE SMC'99 Conference Proceedings. 1999 IEEE Int'l Conf. On Systems, Man, and Cybernetics*, 1999, vol. 4, 317-322.

Camurri, A. et al., "Multi-Paradigm Software Environment for the Real-Time Processing of Sound, Music and Multimedia," *Knowledge-Based Systems*, 1994, 7(2), 114-126.

Camurri, A. et al., "Music and Multimedia Knowledge Representation and Reasoning—The Harp System," *Computer Music J.*, 1995, 19(2sum), 34-58.

Camurri, A., "Music content processing and multimedia: Case studies and emerging applications of intelligent interactive systems," *J. New Music Res.*, 1999, 28(4), 351-363.

Clamen, S.M., "Schema Evolution and Integration", *Distributed and Parallel Databases 2*, 1994, 2, 101-126.

Cohen, W.W. et al., "Web-collaborative filtering: recommending music by crawling the Web," *Computer Networks*, 2000, 33, 685-698.

Conradi, R. "Version Models for Software Configuration Management," *ACM Computing Surveys*, Jun. 1998, 30(2), 232-282.

Conradi, R. et al., "Change-Oriented Versioning: Rationale and Evaluation," *Third Int'l. Workshop—Software Engineering & Its Applications*, Dec. 3-7, 1990, Toulouse, France, pp. 97-108.

Craner, P.M., "New Tool for an Ancient Art: The Computer and Music," *Computers and Humanities*, 1991, 25, 303-313.

De Castro, C. et al., "Schema Versioning for Multitemporal Relational Databases," *Information Systems*, 1997, 22(5), 249-290.

DeRoure, D.C. et al., "Content-based navigation of music using melodic pitch contours," *Multimedia Systems*, 2000, 8, 190-200.

Drossopoulou, S. et al., "A Fragment Calculus—towards a model of Separate Compilation, Linking and Binary Compatibility," *14th Symposium on Logic in Computer Science—IEEE Computer Society*, Jul. 2-5, 1999, Los Alamitos, California, pp. 147-156.

Eisenberg, M. "Programmable applications: exploring the potential for language/interface symbiosys," *Behaviour & Information Technology*, 1995, 14(1), 56-66.

Franconi, E. et al., "A Semantic Approach for Schema Evolution and Versioning in Object-Oriented Databases," J. Lloyd et al., (Eds.), *Computational Logic—CL 2000: Proc. First Int'l. Conference*, Jul. 24-28, 2000, London, UK, pp. 1048-1062.

Gal, A. et al., "A Multiagent Update Process in a Databased with Temporal Data Dependencies and Schema Versioning," *IEEE Transactions on Knowledge and Data Engineering*, Jan./Feb. 1998, 10(1), 21-37.

Gentner, T. et al., "Perceptual classification based on the component structure of song in European starlings," *J. Acoust. Soc. Am.*, Jun. 2000, 107(6), 3369-3381.

Goddard, N.J., "Using the "C" programming language for interface control," *Laboratory Microcomputer*, Autumn 1982, 15-22.

Goldman, C.V. et al., "NetNeg: A connectionist-agent integrated system for representing musical knowledge," *Annals of Mathematics and Artificial Intelligence*, 1999, 25, 69-90.

Goldstein, T.C. et al., "The Object Binary Interface- C++ Objects for Evolvable Shared Class Libraries," *USENIX Association—Proc. of the 1994 USENIX C++ Conference*, Apr. 11-14, 1994, Cambridge, MA, 1-19.

Hori, T. et al., "Automatic music score recognition/play system based on decision based neural network," 1999 *IEEE Third Workshop on Multimedia Signal Processing*, Ostermann, J. et al. (eds.), 1999, 183-184.

Kieckhefer, E. et al., "A computer program for sequencing and presenting complex sounds for auditory neuroimaging studies," *J. Neurosc. Methods*, Aug. 2000, 101(1), 43-48.

Kirk, R. et al., "Midas-Milan—an open distributed processing system for audio signal processing," *J. Audio Enginerr. Soc.*, 1996, 44(3), 119-129.

Krulwich, B., "Lifestyle finder—Intelligent user profiling using large-scale demographic data," *AI Magazine*, 1997, 18(2sum), 37-45.

Lethaby, N., "Multitasking with C++," *Proc. of the 5th Annual Embedded Systems Conference*, Oct. 5-8, 1993, Santa Clara, CA, 2, 103-120.

Lewine, D., "Certifying Binary Applications," *Proc. of the Spring 1992 EurOpen & USENIX Workshop*, Apr. 6-9, 1992, Jersey, Channel Islands, 25-32.

Li, D. et al., "Classification of general audio data for content-based retrieval," *Pattern Recogn. Letts.*, 2001, 22(5), 533-544.

Liang, R.H. et al., "Impromptu Conductor—A Virtual Reality System for Music Generation Based on Supervised Learning," *Displays*, 1994, 15(3), 141-147.

Logrippo, L., "Cluster analysis for the computer-assisted statistical analysis of melodies," *Computers Humanities*, 1986, 20(1), 19-33.

Moreno, P.J. et al., "Using the Fisher Kernal Method for Web Audio Classification," 2000 *IEEE Int'l Conf. on Acoustics, Speech, and Signal Processing, Proceedings*, 2000, vol. 4, 2417-2420.

Morrison, I. et al., "The Design and Prototype Implementation of a "Structure Attribute" Model for Tool Interface Within an IPSE," *Microprocessing and Microprogramming*, 1986, 18, 223-240.

Oiwa, Y. et al., "Extending Java Virtual Machine with Integer-Reference Conversion," *Concurrency: Practice and Experience*, May 2000, 12(6), 407-422.

Oussalah, C. et al., "Complex Object Versioning," *Advanced Information Systems Engineering—Proc. 9th Int'l. Conference, CaiSE '97*, Jun. 16-20, 1997, Catalonia Spain, 259-272.

Pesavento, M. et al., "Unitary Root-Music with a Real-Valued Eigendecomposition: A Theoretical and Experimental Performance Study," *IEEE Transactions on Signal Processing*, May 2000, 48(5), 1306-1314.

Pirn, R., "Some Objective and Subjective Aspects of 3 Acoustically Variable Halls," *Appl. Acoustics*, 1992, 35(3), 221-231.

Proper, H.A., "Data schema design as a schema evolution process", *Data & Knowledge Engineering*, 1997, 22, 159-189.

Roddick, J.F., "A survey of schema versioning issues for database systems," *Information and Software Technology*, 1995, 37(7), 383-393.

Rose, E. et al., "Schema versioning in a temporal object-oriented data model," *Int'l. Journal on Artificial Intelligence Tools*, 1998, 7(3), 293-318.

Serra, A., "New solutions for the transmission of music. Possible methods in view of the reduction of the pass band," *Revista Espanola de Electronica*, Jul. 1976, 23(260), 34-35 (English language abstract attached).

Smith, M.W.A., "A relational database for the study and quantification of tempo directions in music," *Comput. Humanities*, 1994, 28(2), 107-116.

Speiser, J.M. et al., "Signal processing computations using the generalized singular value decomposition," *Proceedings of SPIE—The Int'l Socity for Optical Engineering. Real Time Signal Processing VII*, Bellingham, WA, 1984, 47-55.

Surveyer, J., "C+= (C-Sharp = = Microsoft Java++)? True:False;", *Java Report*, Oct. 2000, 5 pages.

Tsotras, V. et al., "Optimal Versioning of Objects," *Eighth Int'l. Conference on Data Engineering—IEEE Computer Society*, Feb. 2-3, 1992, Tempe, Arizona, 358-365.

Urtado, C. et al., "Complex entity versioning at two granularity levels," *Information Systems*, 1998, 23(3/4), 197-216.

Wieczerzycki, W., "Advanced versioning mechanisms supporting CSCW environments," *Journal of Systems Architecture*, 1997, 43, 215-227.

Yoder, M.A. et al., "Using Multimedia and the Web to teach the theory of digital multimedia signals," *Proceedings. Frontiers in Education*, 1995 25th *Annual Conference. Engineering Education for the 21st Century, IEEE*, Budny, D. et al. (eds.), Nov. 1-4, 1995, vol. 2, Atlanta, GA.

Zhang, T. et al., "Audio content analysis for online audiovisual data segmentation and classification," *IEEE Trans. on Speech and Audio Processing*, May, 2001, 9(4), 441-457.

Zhang, T. et al., "Heuristic approach for generic audio data segmentation and annotation," *Proceedings ACM Multimedia* 99, 1999, 67-76.

\* cited by examiner

US 7,797,272 B2

SYSTEM AND METHOD FOR DYNAMIC PLAYLIST OF MEDIA

CROSS REFERENCE TO RELATED APPLICATION

This application is a continuation of application Ser. No. 09/905,011, filed Jul. 13, 2001 and is incorporated herein by reference in its entirety. This application is related to and claims priority under 35 U.S.C. §119(e) to U.S. Provisional Patent Application Ser. No. 60/218,287, filed Jul. 14, 2000, entitled "SYSTEM AND METHOD FOR DYNAMIC PLAYLIST OF MEDIA", the contents of which are hereby incorporated by reference in their entirety. This application relates to U.S. patent application Ser. No. 09/900,230, filed Jul. 6, 2001 entitled "SYSTEM AND METHOD FOR THE AUTOMATIC TRANSMISSION OF NEW, HIGH AFFINITY MEDIA"; U.S. Pat. No. 6,545,209, issued Apr. 8, 2003 entitled "MUSIC CONTENT CHARACTERISTIC IDENTIFICATION AND MATCHING"; U.S. patent application Ser. No. 09/934,071, filed Aug. 20, 2001 entitled "METHOD AND SYSTEM FOR PROVIDING ADAPTIVE MEDIA PROPERTY CLASSIFICATION"; U.S. patent application Ser. No. 09/900,059, filed Jul. 6, 2001 entitled "SYSTEM AND METHODS FOR PROVIDING AUTOMATIC CLASSIFICATION OF MEDIA ENTITIES ACCORDING TO CONSONANCE PROPERTIES"; U.S. patent application Ser. No. 09/934,774, filed Aug. 21, 2001 entitled "SYSTEM AND METHOD FOR TRAINING A TRAINEE TO CLASSIFY FUNDAMENTAL PROPERTIES OF MEDIA ENTITIES"; U.S. patent application Ser. No. 09/935,349, filed Aug. 21, 2001 entitled "SYSTEM AND METHODS FOR PROVIDING AUTOMATIC CLASSIFICATION OF MEDIA ENTITIES ACCORDING TO SONIC PROPERTIES"; U.S. patent application Ser. No. 09/905,345, filed Jul. 13, 2001 entitled "SYSTEM AND METHOD FOR PROVIDING AUTOMATIC CLASSIFICATION OF MEDIA ENTITIES ACCORDING TO TEMPO PROPERTIES"; U.S. patent application Ser. No. 09/904,465, filed Jul. 13, 2001 entitled "SYSTEM AND METHODS FOR AUTOMATIC DSP PROCESSING"; U.S. patent application Ser. No. 09/942,509, filed Aug. 29, 2001 entitled "SYSTEM AND METHODS FOR PROVIDING AUTOMATIC CLASSIFICATION OF MEDIA ENTITIES ACCORDING TO MELODIC MOVEMENT PROPERTIES"; and U.S. patent application Ser. No. 09/928,004, filed Aug. 10, 2001 entitled "A SYSTEM AND METHOD FOR AUDIO FINGERPRINTING".

FIELD OF THE INVENTION

The present invention relates to a system and method for the dynamic playlist of media to users of computing devices connected to a network.

BACKGROUND OF THE INVENTION

Classifying information that has subjectively perceived attributes or characteristics is difficult. When the information is one or more musical compositions, classification is complicated by the widely varying subjective perceptions of the musical compositions by different listeners. One listener may perceive a particular musical composition as "hauntingly beautiful" whereas another may perceive the same composition as "annoyingly twangy."

In the classical music context, musicologists have developed names for various attributes of musical compositions. Terms such as adagio, fortissimo, or allegro broadly describe the strength with which instruments in an orchestra should be played to properly render a musical composition from sheet music. In the popular music context, there is less agreement upon proper terminology. Composers indicate how to render their musical compositions with annotations such as brightly, softly, etc., but there is no consistent, concise, agreed-upon system for such annotations.

As a result of rapid movement of musical recordings from sheet music to pre-recorded analog media to digital storage and retrieval technologies, this problem has become acute. In particular, as large libraries of digital musical recordings have become available through global computer networks, a need has developed to classify individual musical compositions in a quantitative manner based on highly subjective features, in order to facilitate rapid search and retrieval of large collections of compositions.

Musical compositions and other information are now widely available for sampling and purchase over global computer networks through online merchants such as Amazon.com, Inc., barnesandnoble.com, cdnow.com, etc. A prospective consumer can use a computer system equipped with a standard Web browser to contact an online merchant, browse an online catalog of pre-recorded music, select a song or collection of songs ("album"), and purchase the song or album for shipment direct to the consumer. In this context, online merchants and others desire to assist the consumer in making a purchase selection and desire to suggest possible selections for purchase. However, current classification systems and search and retrieval systems are inadequate for these tasks.

A variety of inadequate classification and search approaches are now used. In one approach, a consumer selects a musical composition for listening or for purchase based on past positive experience with the same artist or with similar music. This approach has a significant disadvantage in that it involves guessing because the consumer has no familiarity with the musical composition that is selected.

In another approach, a merchant classifies musical compositions into broad categories or genres. The disadvantage of this approach is that typically the genres are too broad. For example, a wide variety of qualitatively different albums and songs may be classified in the genre of "Popular Music" or "Rock and Roll."

In still another approach, an online merchant presents a search page to a client associated with the consumer. The merchant receives selection criteria from the client for use in searching the merchant's catalog or database of available music. Normally the selection criteria are limited to song name, album title, or artist name. The merchant searches the database based on the selection criteria and returns a list of matching results to the client. The client selects one item in the list and receives further, detailed information about that item. The merchant also creates and returns one or more critics' reviews, customer reviews, or past purchase information associated with the item.

For example, the merchant may present a review by a music critic of a magazine that critiques the album selected by the client. The merchant may also present informal reviews of the album that have been previously entered into the system by other consumers. Further, the merchant may present suggestions of related music based on prior purchases of others. For example, in the approach of Amazon.com, when a client requests detailed information about a particular album or song, the system displays information stating, "People who bought this album also bought . . . " followed by a list of other albums or songs. The list of other albums or songs is derived from actual purchase experience of the system. This is called "collaborative filtering."

However, this approach has a significant disadvantage, namely that the suggested albums or songs are based on extrinsic similarity as indicated by purchase decisions of others, rather than based upon objective similarity of intrinsic attributes of a requested album or song and the suggested albums or songs. A decision by another consumer to purchase two albums at the same time does not indicate that the two albums are objectively similar or even that the consumer liked both. For example, the consumer might have bought one for the consumer and the second for a third party having greatly differing subjective taste than the consumer. As a result, some pundits have termed the prior approach as the "greater fools" approach because it relies on the judgment of others.

Another disadvantage of collaborative filtering is that output data is normally available only for complete albums and not for individual songs. Thus, a first album that the consumer likes may be broadly similar to second album, but the second album may contain individual songs that are strikingly dissimilar from the first album, and the consumer has no way to detect or act on such dissimilarity.

Still another disadvantage of collaborative filtering is that it requires a large mass of historical data in order to provide useful search results. The search results indicating what others bought are only useful after a large number of transactions, so that meaningful patterns and meaningful similarity emerge. Moreover, early transactions tend to over-influence later buyers, and popular titles tend to self-perpetuate.

In a related approach, the merchant may present information describing a song or an album that is prepared and distributed by the recording artist, a record label, or other entities that are commercially associated with the recording. A disadvantage of this information is that it may be biased, it may deliberately mischaracterize the recording in the hope of increasing its sales, and it is normally based on inconsistent terms and meanings.

In still another approach, digital signal processing (DSP) analysis is used to try to match characteristics from song to song, but DSP analysis alone has proven to be insufficient for classification purposes. While DSP analysis may be effective for some groups or classes of songs, it is ineffective for others, and there has so far been no technique for determining what makes the technique effective for some music and not others. Specifically, such acoustical analysis as has been implemented thus far suffers defects because 1) the effectiveness of the analysis is being questioned regarding the accuracy of the results, thus diminishing the perceived quality by the user and 2) recommendations can only be made if the user manually types in a desired artist or song title from that specific website. Accordingly, DSP analysis, by itself, is unreliable and thus insufficient for widespread commercial or other use.

Accordingly, there is a need for an improved method of classifying information that is characterized by the convergence of subjective or perceptual analysis and DSP acoustical analysis criteria. With such a classification technique, it would be desirable to provide the capability to dynamically generate playlists that reflect various pre-defined and interactive restrictions. It would be further desirable to provide a system and methods as a result of which participating users are offered playlists based upon users' input. It would be still further desirable to aggregate a range of media objects of varying types or categories using various categorization and prioritization methods.

SUMMARY OF THE INVENTION

In view of the foregoing, the present invention provides a system and methods for dynamically generating playlists of media that are offered to participating users. In connection with a system that convergently merges perceptual and digital signal processing analysis of media entities for purposes of classifying the media entities, the present invention provides various means to aggregate a range of media objects to dynamically generate playlists. Techniques for providing prioritization and categorization of media are also included.

Other features of the present invention are described below.

BRIEF DESCRIPTION OF THE DRAWINGS

The system and methods for the dynamic generation of playlists of media are further described with reference to the accompanying drawings in which.

DETAILED DESCRIPTION OF PREFERRED EMBODIMENTS

Overview

The present invention provides a system and method whereby playlists are dynamically generated for transmission to a user of a networked computing device. The present invention leverages the song-by-song analysis and matching capabilities of modern music matching and classification techniques. For example, commonly assigned U.S. Pat. No. 6,545,209, issued Apr. 8, 2003, hereinafter the analysis and matching system, describes novel techniques for analyzing and matching based upon musical property mappings, such as may be defined for a song or a media station. The analysis and matching system enables searching of an analysis and matching database, based upon high affinity input mappings extracted or captured in accordance with the present invention, for the purpose of returning songs that are correlated to the input mappings. The present invention takes such technique(s) to dynamically generate a playlist of songs that are similarly situated using characteristics that are inherent within the songs. In operation, the dynamic playlist generation function of the present invention may further personalize a network-based media experience, such as a Web-based radio experience of a computing device, for a user. In this regard, the present invention provides an automated system and method that aggregates playlists of songs for presentation to participating users of any network-enabled computing device via wired or wireless means.

Exemplary Computer and Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 1:
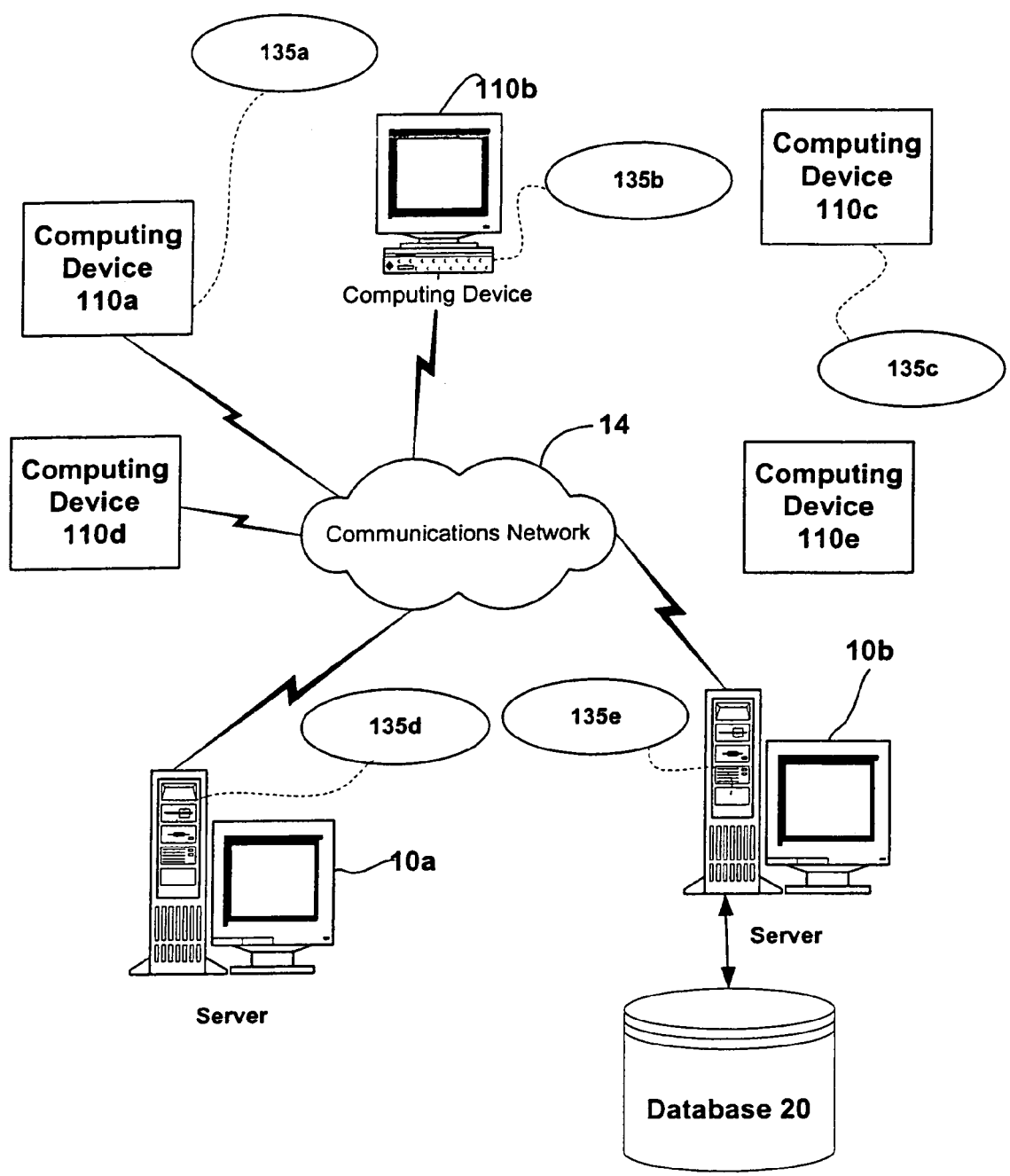
FIG. 1 is a block diagram representing an exemplary network environment in which the present invention may be implemented.

FIG. 1 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 in accordance with the present invention, such as a database 20 for storing classification information, music and/or software incident thereto. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Classification

In accordance with one aspect of the present invention, a unique classification is implemented which combines human and machine classification techniques in a convergent manner, from which a canonical set of rules for classifying music may be developed, and from which a database, or other storage element, may be filled with classified songs. With such techniques and rules, radio stations, studios and/or anyone else with an interest in classifying music can classify new music. With such a database, music association may be implemented in real time, so that playlists or lists of related (or unrelated if the case requires) media entities may be generated. Playlists may be generated, for example, from a single song and/or a user preference profile in accordance with an appropriate analysis and matching algorithm performed on the data store of the database. Nearest neighbor and/or other matching algorithms may be utilized to locate songs that are similar to the single song and/or are suited to the user profile.

Figure 2:
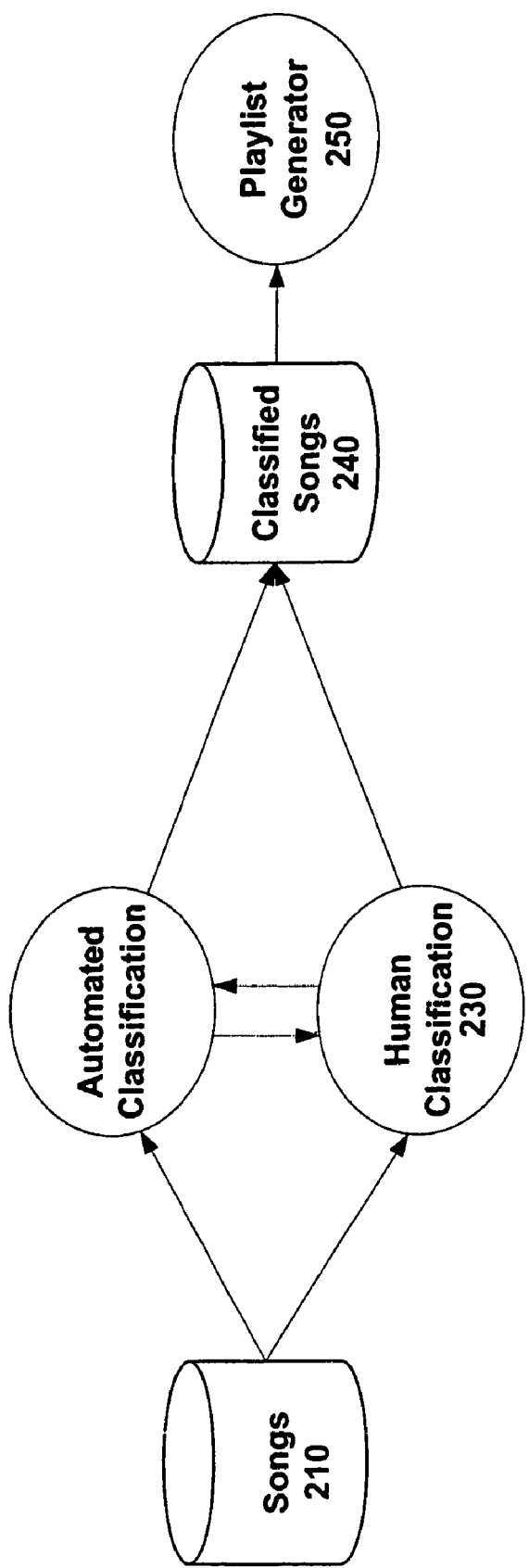
FIG. 2 is a high level block diagram representing the media content classification system utilized to classify media, such as music, in accordance with the present invention.

FIG. 2 illustrates an exemplary classification technique in accordance with the present invention. Media entities, such as songs 210, from wherever retrieved or found, are classified according to human classification techniques at 220 and also classified according to automated computerized DSP classification techniques at 230. 220 and 230 may be performed in either order, as shown by the dashed lines, because it is the marriage or convergence of the two analyses that provides a stable set of classified songs at 240. As discussed above, once such a database of songs is classified according to both human and automated techniques, the database becomes a powerful tool for generating songs with a playlist generator 250. A playlist generator 250 may take input(s) regarding song attributes or qualities, which may be a song or user preferences, and may output a playlist, recommend other songs to a user, filter new music, etc. depending upon the goal of using the relational information provided by the invention. In the case of a song as an input, first, a DSP analysis of the input song is performed to determine the attributes, qualities, likelihood of success, etc. of the song. In the case of user preferences as an input, a search may be performed for songs that match the user preferences to create a playlist or make recommendations for new music. In the case of filtering new music, the rules used to classify the songs in database 240 may be leveraged to determine the attributes, qualities, genre, likelihood of success, etc. of the new music. In effect, the rules can be used as a filter to supplement any other decision making processes with respect to the new music.

Figure 3:
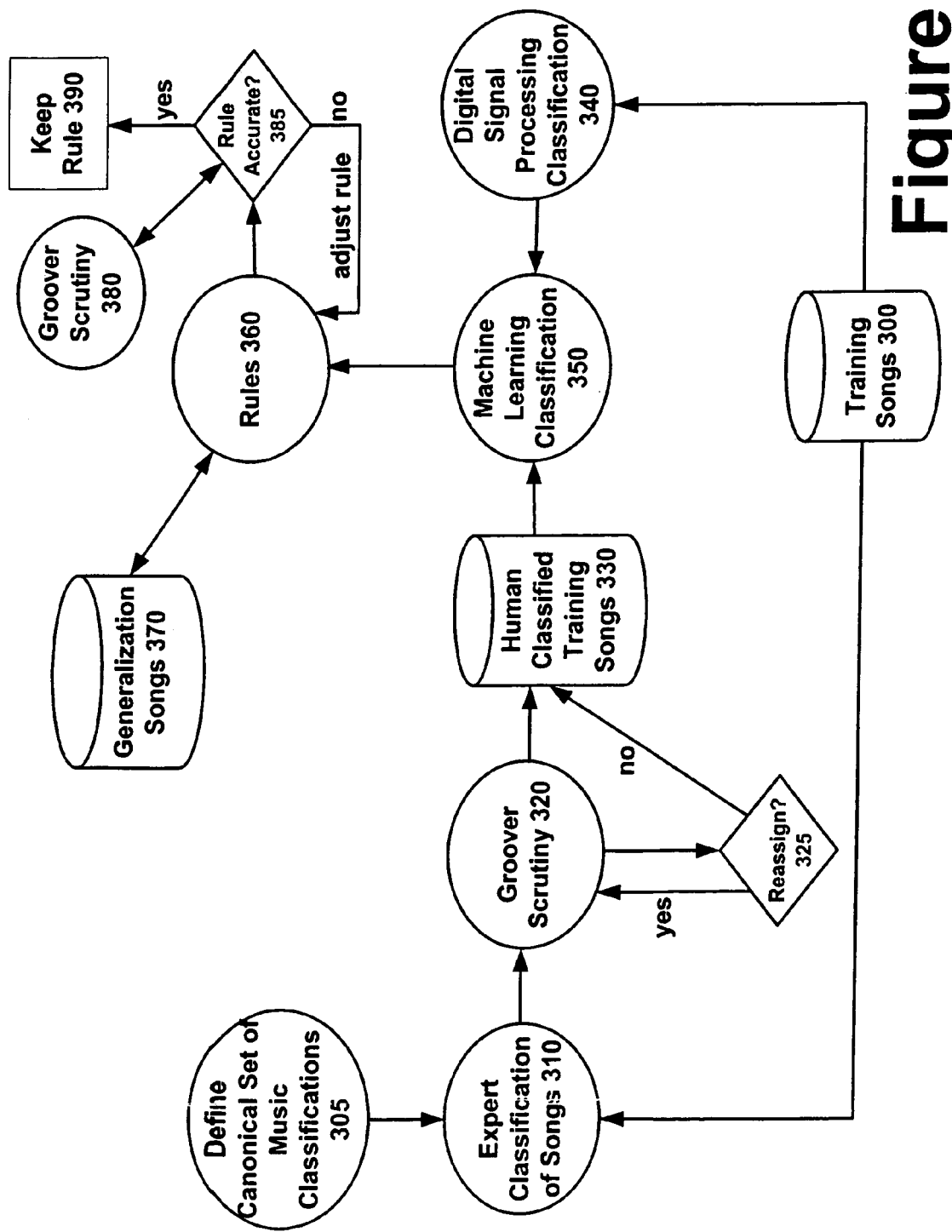
FIG. 3 is block diagram illustrating an exemplary method of the generation of general media classification rules from analyzing the convergence of classification in part based upon subjective and in part based upon digital signal processing techniques.

FIG. 3 illustrates an embodiment of the invention, which generates generalized rules for a classification system. A first goal is to train a database with enough songs so that the human and automated classification processes converge, from which a consistent set of classification rules may be adopted, and adjusted to accuracy. First, at 305, a general set of classifications are agreed upon in order to proceed consistently i.e., a consistent set of terminology is used to classify music in accordance with the present invention. At 310, a first level of expert classification is implemented, whereby experts classify a set of training songs in database 300. This first level of expert is fewer in number than a second level of expert, termed herein a groover, and in theory has greater expertise in classifying music than the second level of expert or groover. The songs in database 300 may originate from anywhere, and are intended to represent a broad cross-section of music. At 320, the groovers implement a second level of expert classification. There is a training process in accordance with the invention by which groovers learn to consistently classify music, for example to 92-95% accuracy. The groover scrutiny reevaluates the classification of 310, and reclassifies the music at 325 if the groover determines that reassignment should be performed before storing the song in human classified training song database 330.

Before, after or at the same time as the human classification process, the songs from database 300 are classified according to digital signal processing (DSP) techniques at 340. Exemplary classifications for songs include, inter alia, tempo, sonic, melodic movement and musical consonance characterizations. Classifications for other types of media, such as video or software are also contemplated. The quantitative machine classifications and qualitative human classifications for a given piece of media, such as a song, are then placed into what is referred to herein as a classification chain, which may be an array or other list of vectors, wherein each vector contains the machine and human classification attributes assigned to the piece of media. Machine learning classification module 350 marries the classifications made by humans and the classifications made by machines, and in particular, creates a rule when a trend meets certain criteria. For example, if songs with heavy activity in the frequency spectrum at 3 kHz, as determined by the DSP processing, are also characterized as 'jazzy' by humans, a rule can be created to this effect. The rule would be, for example: songs with heavy activity at 3 KHz are jazzy. Thus, when enough data yields a rule, machine learning classification module 350 outputs a rule to rule set 360. While this example alone may be an oversimplification, since music patterns are considerably more complex, it can be appreciated that certain DSP analyses correlate well to human analyses.

However, once a rule is created, it is not considered a generalized rule. The rule is then tested against like pieces of media, such as song(s), in the database 370. If the rule works for the generalization song(s) 370, the rule is considered generalized. The rule is then subjected to groover scrutiny 380 to determine if it is an accurate rule at 385. If the rule is inaccurate according to groover scrutiny, the rule is adjusted. If the rule is considered to be accurate, then the rule is kept as a relational rule e.g., that may classify new media.

The above-described technique thus maps a pre-defined parameter space to a psychoacoustic perceptual space defined by musical experts. This mapping enables content-based searching of media, which in part enables the automatic transmission of high affinity media content, as described below.

Dynamic Generation of Playlists

The present invention relates generally to the dynamic generation of playlists for communication to a network-enabled computing device, such as a radio, or a radio broadcast rendered via a network portal, such as a Web site. The dynamic playlist generation process works via an interplay of features with the above-described song analysis and matching system. A user makes a specific choice that represents a high affinity state/space for the user, such as a choice representing something desirable to the specific user about a piece or set of media. The choice may be the choice of a piece of media itself, a choice regarding a characteristic of a song or songs more generally, or a choice regarding a characteristic of the user. The specific choice within any of the features can be represented as a mapping along a set of fundamental musical properties that captures a user's psychoacoustic preferences. The song analysis and matching system then scans the database for other musical entities that have a similar mapping of musical properties and generates playlists according to inherent characteristics among the stored songs. These newly found entities are then automatically returned to the user in the form of one or more playlist. The return of these results leverages the user's original choice to provide the user with an experience that tailors itself automatically to the user's specific psychoacoustic preferences, and hence prolongs the user's high affinity state/space. The linking works because every piece of audio media transmitted to the user is mapped on a set of fundamental musical properties that in sum can represent a user's high affinity, state/space.

Existing artist and genre-based ways to specify a radio stream are very broad and hence have not captured a user's specific psychoacoustic preferences, and hence cannot as effectively prolong a user's high affinity stat/space.

In connection with the above-described song analysis, classification and matching processes, the present invention provides advancements in the area of automatic personalization of a user's media experience, all of which allow the user to get a highly targeted set of music via only a small amount of effort. By leveraging the song analysis and matching techniques along with the playlist generation, users can accurately "ask" for music for which there will be high affinity. A user specifies psychoacoustic preferences with the information he or she presents to the song analysis and matching system.

Figure 4:
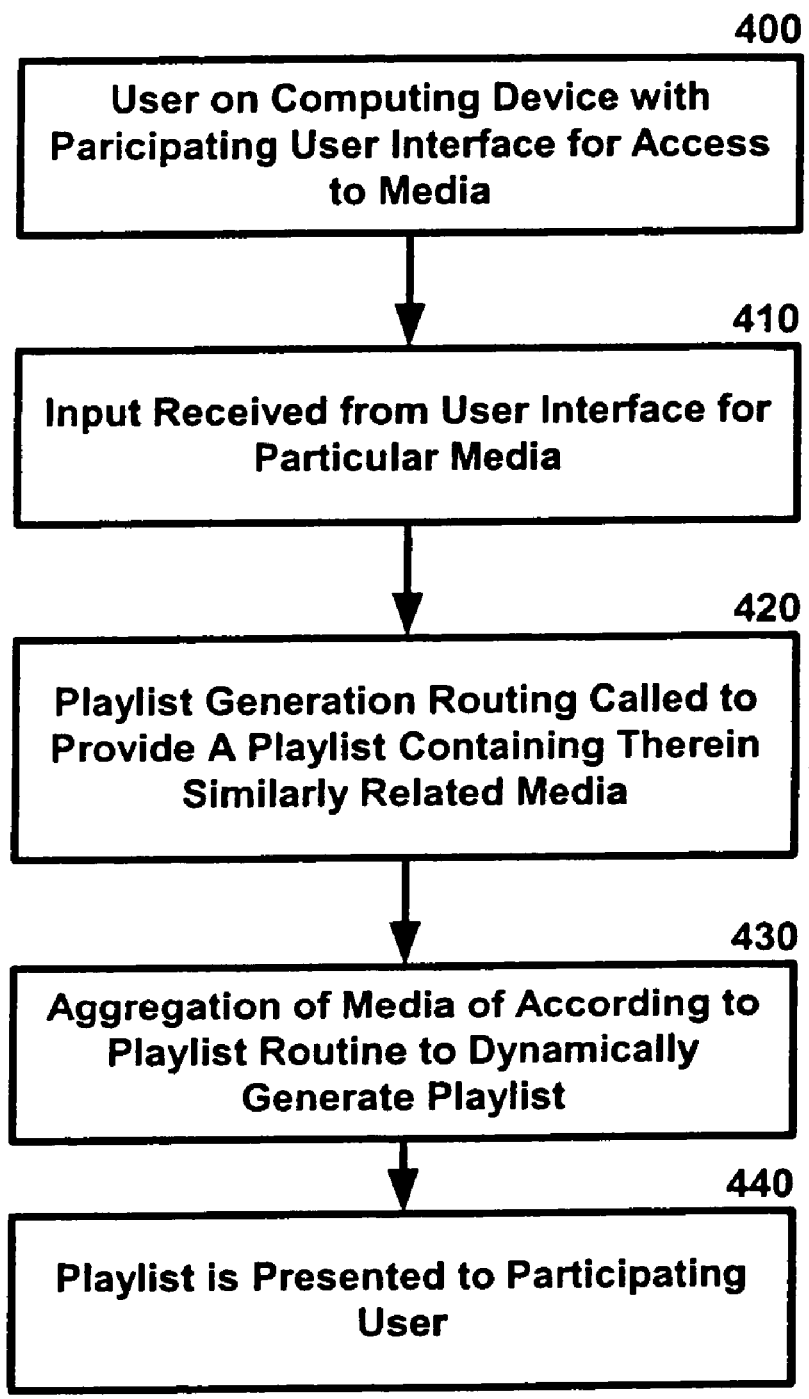
FIG. 4 illustrates an exemplary process of the operation of a dynamically generated playlist in accordance with the present invention.
Figure 5:
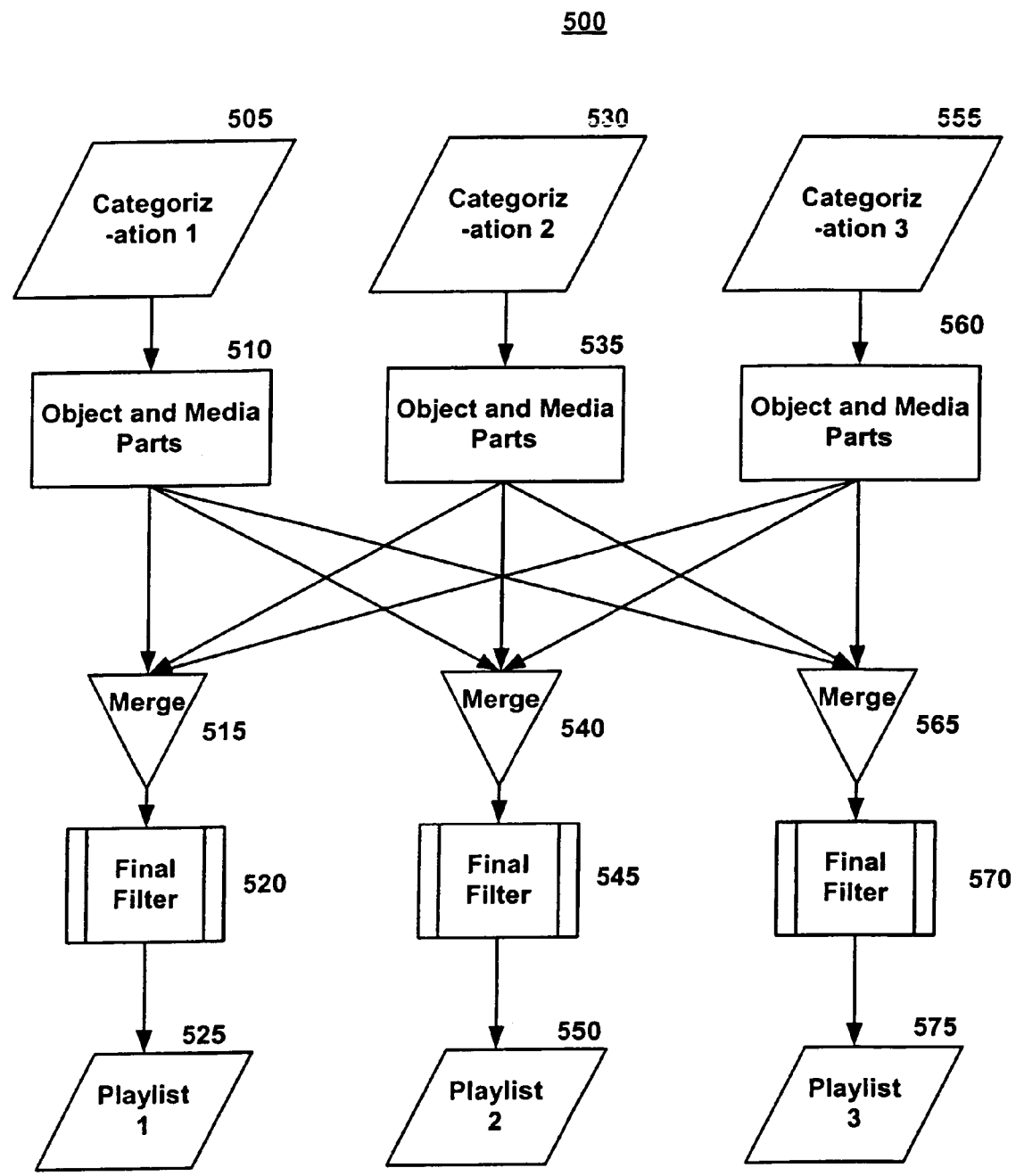
FIG. 5 is a block diagram showing data flow and processing steps when dynamically generating a playlist in accordance with the present invention.

FIGS. 4 and 5 illustrate the processing performed to generate playlists responsive to participating users requests. FIG. 4 illustrates an embodiment of the present invention whereby a media station, such as a radio station, is tailored to a user through the user's specification of a piece of media, such as a song. From the characteristics of the song, a high affinity playlist is generated. At 400, a user finds a computing device having a user interface in accordance with the present invention for accessing any of a variety of types of media, such as music. The user interface does not have to follow any particular format, and a user may use any known input device for entering data into the system. At 410, a user searches for, locates, finds or otherwise designates via an input device a familiar song that the user finds pleasing psychoacoustically. At 420, the selection of the media link itself begins the automatic playlist generation process, although an affirmative action on the part of the user could also be implemented to begin the process. At 430, as a result of the start of the automatic personalization process, an immediate search of media analysis and matching database for similarly matched media is performed. Also at block 430, the matched media is also aggregated according to the processing steps of FIG. 5 to produce one or more playlists. At 440, the results of step 430, namely the return of media similarly matched to the song selected, are built into the present or actual playlist of the media station.

Thus, the user may launch or instantiate a radio station on a network-enabled computing device in a one-step personalization process, whereby the process automatically generates one or more playlists having therein a set of songs with similar fundamental musical properties as the chosen song or that satisfy some user input criteria (e.g. generate a playlist songs that are performed by or sound like the artist Sade). This process connects songs for which a user has high affinity to the base song by finding other songs that have similar mappings and hence a song likelihood of continuing the user's high affinity state/space. Automatically returned is the related playlist of songs. The success of the above process, in part, hinges on the classification scheme utilized at the front end of the present invention, wherein both perceptual analysis techniques and acoustic analysis techniques are utilized, providing a degree of matching success in connection with the media analysis and matching database.

Generally, playlist generation consists of the aggregation of a range of media objects of varying types or categories, each of which has its own list of media parts based on a prioritization or categorization method. For example, the media objects may be prioritized by the strength of their similarity (e.g. musical similarity in the case of musical media entities) to the initial media object on which the playlist is based on. Additionally, a level of popularity can be assigned or calculated from participating user feedback and site usage to give higher priorities to more popular media entities. This popularity may assist in the prioritization process. These objects are first obtained by describing the final playlist in terms of groups of common underlying structures. For each of these objects an individual set of corresponding media is gathered using the given categorization for the media. The categorization of the media may be performed by a media matching and analysis system. An exemplary media matching and analysis system is further described by commonly assigned U.S. Pat. No. 6,545,209, issued Apr. 8, 2003 entitled "MUSIC CONTENT CHARACTERISTIC IDENTIFICATION AND MATCHING", which is herein incorporated by reference in its entirety.

After media sets for each object have been compiled, the object sets are merged based on their interactions. These interactions can be defined by the relationships between objects, user defined parameters, or other methods placed in the system. For example, these media objects may include, but are not limited to, artist, album, song, genre, or sub-genre. The playlist resulting from the object merge is then filtered to reflect various restrictions both from the server and client side. These restrictions can include legal or user restrictions.

As mentioned, the playlist generation process begins by describing the resulting playlist in terms of various media objects that form the main parts of the playlist. This allows the playlist to be described in smaller and more manageable processing sets.

As shown by FIG. 5, in operation, dynamic playlist generation system 500 employs an object (510, 530, and 560) to access a set of categorization information (505, 530, and 55) and determines the playlist (525, 550, and 575) that would result for it alone. This is done by accessing a categorization of media (e.g. 505, 530, or 555) and obtaining the corresponding set of media relevant to the calling object (e.g. 510, 535, or 565). Each object (e.g. 510, 535, or 560) also has the option to include various parameters in its call to the categorization set. This enables each object to further control its resulting playlist (e.g. playlist 525, 550, or 575). Examples of such parameters are feel, tempo, and mood. The end result of the extra parameters is the ability to achieve greater personalization for participating users.

By describing the playlist in terms of objects, when implemented, processing can be distributed among a distributed computing environment, contained therein computing applications or individual computing environments targeted and optimized for the characteristics of its objects. The modularity of present invention contributes to adaptability allowing ease in the upgrade of processing or personalization features.

After a set of media has been acquired for each object, the next step to generate the playlist contemplates combining object sets through merge operations 515, 540, and 565. In an illustrative implementation, this operation is realized through the use of a weighted randomization algorithm to select the object from which to acquire each additional media part for the final playlist. The weighting is based on various parameters that can describe the playlist and the interactions between the objects. For example weighting parameters may include, but is not limited to, participating user feedback or data resulting from an analysis for participating user behavior. In addition, similar to prioritization processing, popularity may be used as a weighting parameter. The component that chooses the object may be a central process that performs the final aggregation, any necessary final checks, and distributes generated playlists. In operation, the various lists of media parts (e.g. song, artist information, song information, etc.) can be generated using separate processes operating in parallel. In doing so, these separate processes can be configured individually on the media on which they are operating. For example, a first process may execute to generate a playlists of songs, while, in parallel, a second process is configured to create a list of artist interviews, news clips, etc. These first and second processes can then act as input to the central process that, in turn, creates the final playlist(s) based on the weighted parameters described above.

Once an object has been chosen, the next media part in that object's set is obtained. No further operations are performed on each object's set during the merge. As a result, the present invention is able to merge media parts for the final playlist in linear time with the processing time not being dependent on the number of objects or media parts for each object, but simply the number of media parts in the final playlist. Additionally, the weighted randomization ensures the user experiences different playlists with each usage while the playlists still reflect the user's preferences.

Further, as shown in FIG. 5, playlists 525, 550, and 575 resulting from the merged objects are next run through filters 520, 545, and 570 having predefined restrictions to process any further system restrictions and/or user personalizations. In the illustrative implementation provided, such restrictions may be limited to functions that can be performed in linear time dependent on a variable 'p', with variable 'p' being the number of media parts in the final playlist before filtering. Exemplary filter restrictions include, but are not limited to, Recording Industry Association of America (RIAA) Broadcast Restrictions, or user restrictions, such as, dumped media parts. The operations performed by the filters on the playlist involve simply removing offending media parts in order to meet all restrictions.

As mentioned above, the media contemplated by the present invention in all of its various embodiments is not limited to music or songs, but rather the invention applies to any media to which a classification technique may be applied that merges perceptual (human) analysis with acoustic (DSP) analysis for increased accuracy in classification and matching.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of music data, one skilled in the art will recognize that the present invention is not limited to the music, and that the methods of tailoring media to a user, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for dynamically generating a playlist of media entities comprising:

analyzing media content to determine the characteristics inherent within at least one of a desired plurality of media entities, wherein the media content characteristics comprise any of tempo, sonic, melodic movement, or musical consonance, wherein the media content characteristics are determined by human classification and digital signal processing classification, wherein digital signal processing comprises sampling the media content and objectively measuring a quantitative value of the media content, wherein the media content is a song;

generating the playlist of media entities based on the media content characteristics, wherein the media entities are audio files; and distributing the generated playlist of media entities over a network.

2. The method of claim 1, further comprising maintaining a set of playlist characteristics, wherein generating the playlist of media entities comprises filtering the media content characteristics based on the playlist characteristics.

3. The method of claim 1, further comprising defining playlist characteristics, wherein generating the playlist of media entities is based on the playlist characteristics and the media content characteristics.

4. The method of claim 1, further comprising weighting the media content characteristics.

5. The method of claim 1, further comprising filtering the media content characteristics according to predefined restrictions.

6. The method of claim 1, further comprising receiving a request to generate the playlist of media entities.

7. The method of claim 6, wherein the request comprises parameters defining the scope of the requested playlist of media entities.

8. A computer readable medium bearing computer executable instructions for carrying out the method of claim 1.

9. A modulated data signal carrying computer executable instructions for carrying out the method of claim 1.

10. A computing device comprising first means and second means for carrying out each of the steps of the method of claim 1.

* * * * *